(12) United States Patent
Busch et al.

(10) Patent No.: US 9,935,545 B2
(45) Date of Patent: Apr. 3, 2018

(54) POWER SUPPLY UNIT ARRANGEMENT FOR AN ELECTRONIC DEVICE, POWER SUPPLY FOR AN ELECTRONIC DEVICE HAVING AT LEAST A HIGH-LOAD STATE AND A LOW-LOAD STATE AND COMPUTER SYSTEM HAVING A NORMAL OPERATING STATE AND AT LEAST ONE ENERGY SAVING STATE

(71) Applicant: Fujitsu Technology Solutions Intellectual Property GmbH, München (DE)

(72) Inventors: Peter Busch, Augsburg (DE); Willi Sterzik, Augsburg (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 0 days.

(21) Appl. No.: 14/440,898

(22) PCT Filed: Aug. 19, 2014

(86) PCT No.: PCT/EP2014/067671
§ 371 (c)(1),
(2) Date: May 6, 2015

(87) PCT Pub. No.: WO2015/176781
PCT Pub. Date: Nov. 26, 2015

(65) Prior Publication Data
US 2017/0104413 A1 Apr. 13, 2017

(30) Foreign Application Priority Data
May 19, 2014 (DE) .................... 10 2014 107 019

(51) Int. Cl.
*H02M 3/158* (2006.01)
*H02M 1/36* (2007.01)

(52) U.S. Cl.
CPC ............. *H02M 3/158* (2013.01); *H02M 1/36* (2013.01)

(58) Field of Classification Search
CPC . H02M 2001/0025; H02M 2001/0029; H02M 2001/0041; H02M 2001/0067;
(Continued)

(56) References Cited

U.S. PATENT DOCUMENTS 5,754,445 A * 5/1998 Jouper ...................... H02J 1/14
700/276
6,031,747 A * 2/2000 Ilic ........................ H02M 3/285
363/21.12

(Continued)

FOREIGN PATENT DOCUMENTS

DE 11 2007 000 698 T5 2/2009
DE 10 2010 035 112 A1 2/2012
(Continued)

OTHER PUBLICATIONS

Japanese Office Action dated Sep. 6, 2016 of corresponding Japanese Application No. 2016-520545, along with an English translation.
(Continued)

*Primary Examiner* — Jeffrey Gblende
*Assistant Examiner* — David A. Singh
(74) *Attorney, Agent, or Firm* — DLA Piper LLP (US)

(57) ABSTRACT

A power supply unit arrangement for an electronic device includes a first switching converter with a first control loop that provides a controlled output voltage (DC-out) at a node; a second switching converter with a second control loop that alternatively provides the controlled output voltage (DC-out) at the node; and an open-loop control circuit connected to the first control loop and the second control loop, wherein the open-loop control circuit, upon a changeover of the
(Continued)

current supply from the first switching converter to the second switching converter, sets a predetermined control state of the first control loop and deactivates the first switching converter and, upon a changeover of the current supply from the second switching converter to the first switching converter, reactivates the first switching converter using the predetermined control state.

17 Claims, 5 Drawing Sheets

(58) Field of Classification Search
CPC ... H02M 2001/007; H02M 2001/0074; H02M 2001/0077; H02M 2001/008; H02M 2001/0083; H02M 2001/009; H02M 2001/0093; H02M 1/084; H02M 1/36; H02M 1/38; H02M 3/156; H02M 3/158; H02M 3/1584; H02M 3/285; H02J 2001/106; H02J 1/10; H02J 1/102; H02J 1/12; H02J 1/14
USPC .... 323/234, 265, 268, 271, 272; 363/13, 15, 363/16, 20, 21.01, 21.04, 21.07, 21.09, 363/21.1
See application file for complete search history.

(56) References Cited

U.S. PATENT DOCUMENTS

| | | | |
|---|---|---|---|
| 6,127,815 A | 10/2000 | Wilcox | |
| 6,343,026 B1* | 1/2002 | Perry | H02M 3/285 323/272 |
| 2002/0135338 A1* | 9/2002 | Hobrecht | H02J 1/102 323/272 |
| 2003/0095422 A1* | 5/2003 | Nagaki | H02J 1/102 363/65 |
| 2003/0231012 A1 | 12/2003 | Corva et al. | |
| 2004/0011973 A1* | 1/2004 | Dodson, III | H04B 10/801 250/551 |
| 2004/0201279 A1* | 10/2004 | Templeton | H02J 1/102 307/11 |
| 2009/0322301 A1* | 12/2009 | Chang | H02J 1/102 323/284 |
| 2010/0164292 A1* | 7/2010 | Freeman | G06F 1/263 307/80 |
| 2011/0096063 A1 | 4/2011 | Kim | |
| 2011/0107122 A1* | 5/2011 | Wang | H02J 1/102 713/300 |
| 2011/0316514 A1* | 12/2011 | Deboy | H02M 3/1584 323/312 |
| 2012/0155131 A1* | 6/2012 | Moreno-Castaneda | H02M 7/23 363/69 |
| 2012/0163051 A1* | 6/2012 | Vogman | H02M 1/4208 363/125 |
| 2012/0170321 A1 | 7/2012 | Yang et al. | |
| 2012/0176114 A1* | 7/2012 | Yamadaya | H02J 1/102 323/311 |

FOREIGN PATENT DOCUMENTS

| | | |
|---|---|---|
| EP | 2 209 196 A1 | 7/2010 |
| JP | 2001-204137 | 7/2001 |
| JP | 2007-28797 | 2/2007 |
| JP | 2009-177909 | 8/2009 |
| JP | 2012-114973 | 6/2012 |
| JP | 2012-244862 | 12/2012 |
| WO | 2012/087618 A2 | 6/2012 |

OTHER PUBLICATIONS

International Search Report from PCT/EP2014/067671 dated Jan. 19, 2015 along with its English translation.

* cited by examiner

POWER SUPPLY UNIT ARRANGEMENT FOR AN ELECTRONIC DEVICE, POWER SUPPLY FOR AN ELECTRONIC DEVICE HAVING AT LEAST A HIGH-LOAD STATE AND A LOW-LOAD STATE AND COMPUTER SYSTEM HAVING A NORMAL OPERATING STATE AND AT LEAST ONE ENERGY SAVING STATE

TECHNICAL FIELD

This disclosure relates to a power supply unit arrangement for an electronic device such as, in particular, a computer. In particular, the disclosure relates to a power supply unit arrangement comprising a first switching converter with a first control loop that provides a controlled output voltage, and a second switching converter with a second control loop that alternatively provides the controlled output voltage.

BACKGROUND

Power supply unit arrangements comprising two switching converters that alternatively provide a controlled output voltage are known. They serve, inter alia, for redundant current supply or supplying an electronic device having different power consumptions in different operating states.

FIG. 1 shows such a power supply unit arrangement 10 comprising a first switching converter 11 and a second switching converter 12. The first switching converter 11 provides a controlled output voltage, for example, a controlled DC voltage DC-out1 at a first output 13 of the power supply unit arrangement 10. The second switching converter 12 equivalently provides a second output voltage, for example, a controlled DC voltage DC-out2 at a second output 14. Both switching converters 11 and 12 are supplied with a common supply voltage, for example, a rectified intermediate voltage Prim-DC from an input 15.

In that example, the first switching converter 11 and the second switching converter 12 are each a so-called DC/DC converter which, on the basis of an amplitude of a control signal Prim-Control, sets the magnitude of the voltage output at the output 13 and 14, respectively. For the closed-loop control thereof, the power supply unit arrangement 10 in accordance with FIG. 1 comprises on the secondary side a first control loop 16 for the first switching converter 11 and also a second control loop 17 for the second switching converter 12. By the control loop 16, the voltage at the first output 13 is controlled to a predetermined value depending on a predefined reference voltage Vref_1a. Equivalently, the voltage at the second output 14 is controlled to a predetermined value by the second control loop 17 using a second reference voltage Vref_2a.

Depending on the device supplied by the power supply unit arrangement 10, the output voltages DC-out1 and DC-out2 can either be of identical magnitude or of different magnitudes. By way of example, it is possible to provide a voltage of 12 V at both outputs 13 and 14. In the arrangement described, the second switching converter 12 furthermore provides a primary auxiliary voltage for operation of the two switching converters 11 and 12.

What is problematic in the power supply unit arrangement 10 described with reference to FIG. 1 is, inter alia, the fact that the switching converters 11 and 12 and also the associated control loops 16 and 17 generally have to be supplied with an operating voltage even if an electronic device connected to the outputs 13 or 14 does not take up any power from the respective switching converter 11 or 12. If the first switching converter 11 is, for example, a main converter that operates a computer in a normal operating state and the second switching converter 12 is an auxiliary converter that provides an operating voltage in an energy saving mode, the first switching converter 11 and the associated control loop 16 always consume a small amount of energy even in the energy saving mode of the computer.

A further problem is that one or both switching converters is or are often operated with a comparatively low output power that is significantly less than the rated output power thereof. The energy efficiency of switched-mode power supply units, comprising one or a plurality of switching converters, depends inter alia on the output power of the switching converters. This relationship is illustratively represented in FIG. 2.

FIG. 2 shows efficiency profiles I and II of the first and second switching converters 11 and 12, respectively, in accordance with FIG. 1. The power in watts [W] is plotted on the abscissa, while the efficiency in percent [%] is plotted on the ordinate. The efficiency profile I describes the efficiency profile of the first converter circuit 3, while the efficiency profile II represents the efficiency profile of the second converter circuit 4. It can be discerned, in particular, that the efficiency and, hence, the energy efficiency of switched-mode power supply units increases with increasing output loading. Precisely computers and other devices appertaining to information technology are often operated over a relatively long period of time in a low-load range far below the maximum output power of the switching converters used.

It is evident from FIG. 2 that the first switching converter 11 (profile I) appears to be expedient for a power consumption starting from, e.g., 35 watts, while the second switching converter 12 (profile II) appears to be more expedient for a power consumption of, e.g., 0 watts to 35 watts. That means that the two efficiency profiles I and II intersect at a point at an output power of approximately 35 watts. Consequently, operation of the second switching converter 12 (profile II) would be advantageous in a low-load range, while operation of the first switching converter 11 (profile I) would be advantageous in a normal or high-load range.

To improve the energy efficiency of power supply units, DE 10 2010 035 112 A1 discloses a closed-loop control circuit for an auxiliary power supply unit, comprising a control loop that controls a voltage converter of the auxiliary power supply unit to a setpoint voltage by a controlled variable. In that case, the control loop comprises an additional circuit designed to limit a change in the controlled variable upon provision of an external voltage of a different voltage source at a first output that outputs the voltage generated by the auxiliary power supply unit if the external voltage exceeds the setpoint voltage of the auxiliary power supply unit.

The known circuit enables outputting of a supply voltage of two different switching converters at a common output. In that way, an electrical power required on the consumer side can optionally be provided by an auxiliary power supply unit or a main power supply unit such that the respective power supply units can preferably be operated in a range with comparatively high energy efficiency. In the known power supply unit arrangement, the auxiliary power supply unit is held in an active state by an additional circuit to prevent a sudden voltage dip from the main power supply unit being switched off. What is disadvantageous about the known circuit is that, in the event of an abrupt rise in the load, the converter of the main power supply unit does not ramp up rapidly enough and the auxiliary power supply unit is thus overloaded and possibly switches off.

It could therefore be helpful to provide an improved power supply unit arrangement which enables a reliable and efficient supply of a consumer with a controlled output voltage in a low-load range. Preferably, the power supply unit arrangement should have a particularly high energy efficiency over a relatively wide output power range. In this case, the power supply unit arrangement should not rely on the provision of external control signals, for example, by the device supplied by it.

SUMMARY

We provide a power supply unit arrangement for an electronic device including a first switching converter with a first control loop that provides a controlled output voltage (DC-out) at a node; a second switching converter with a second control loop that alternatively provides the controlled output voltage (DC-out) at the node; and an open-loop control circuit connected to the first control loop and the second control loop, wherein the open-loop control circuit, upon a changeover of the current supply from the first switching converter to the second switching converter, sets a predetermined control state of the first control loop and deactivates the first switching converter and, upon a changeover of the current supply from the second switching converter to the first switching converter, reactivates the first switching converter using the predetermined control state.

We also provide a power supply for an electronic device having at least a high-load state and a low-load-state, including a main switching converter with a first control loop that provides a controlled output voltage (DC-out) at a node for the electronic device in the high-load state; an auxiliary switching converter with a second control loop that alternatively provides the controlled output voltage (DE-out) at the node for the electronic device in the low-load state; and a control circuit connected to the first control loop and the second control loop, wherein the control circuit, upon a changeover of the current supply from the main switching converter to the auxiliary switching converter, sets a predetermined control state of the first control loop and deactivates the first switching converter and, upon a changeover of the current supply from the auxiliary switching converter to the main switching converter, reactivates the first switching converter using the predetermined control state.

We further provide a computer system having a normal operating and at least one energy saving state, the computer system including a power supply unit, wherein the power supply unit includes a main switching converter with a first control loop that provides a controlled output voltage (DC-out) at a node for the computer system in the normal operating state; an auxiliary switching converter with a second control loop that alternatively provides the controlled output voltage (DC-out) at the node for the computer system in the at least one energy saving state; and a control circuit connected to the first control loop and the second control loop, wherein the control circuit, upon detection of a change of an operating state of the computer system from the normal operating state to the at least one energy saving state, changes the current supply from the main switching converter to the auxiliary switching converter, sets a predetermined control state of the first control loop and deactivates the first switching converter and, upon detection of a change of the operating state of the computer system from the at least one energy-saving state to the normal operating state, changes the current supply from the auxiliary switching converter to the main switching converter and reactives the first switching converter using the predetermined control state.

LIST OF REFERENCE SIGNS

Figure 1:
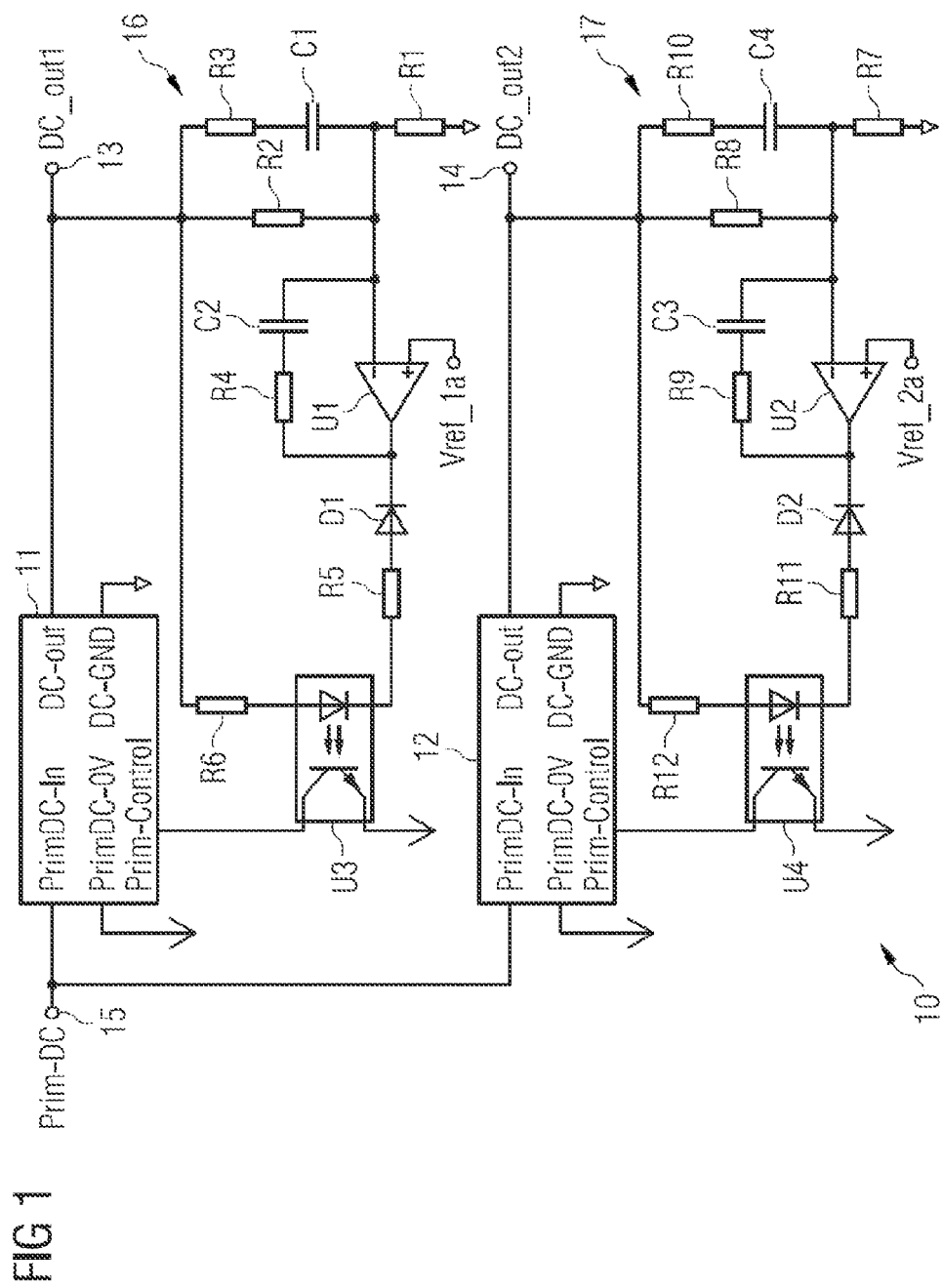
FIG. 1 shows a known power supply unit arrangement comprising two independent switching converters.
Figure 2:
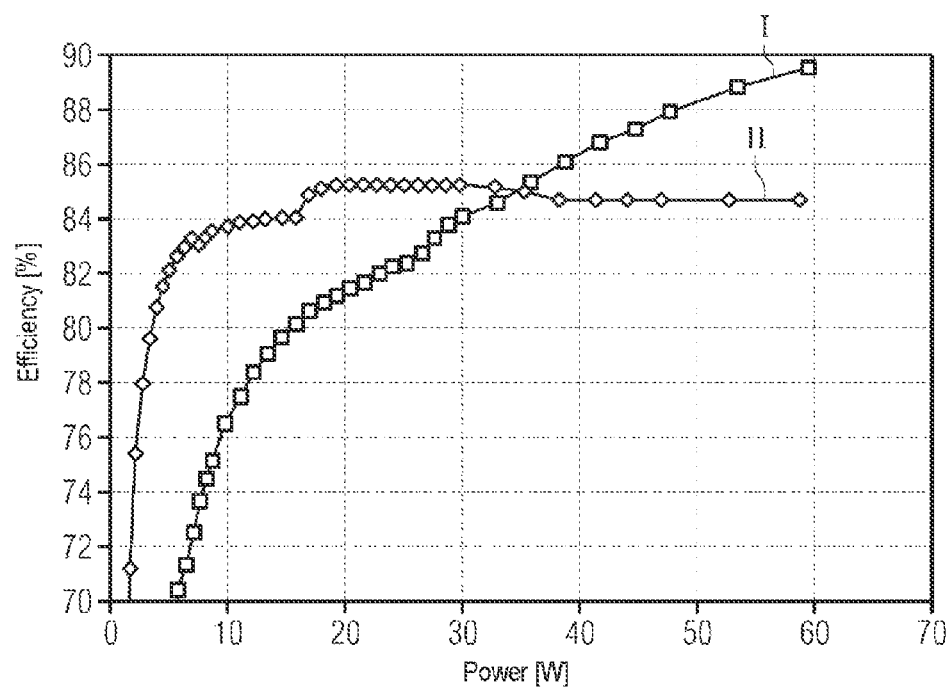
FIG. 2 shows the energy efficiency of two switching converters as a function of their output power.

10 Power supply unit arrangement
11 First switching converter
12 Second switching converter
13 First output
14 Second output
15 Input
16 First control loop
17 Second control loop
18 Node
19 Common output
20 Current comparator
21 First internal node
22 Second internal node
C1 to C5 Capacitor
D1 to D4 Diode
M1a, M1b, M1c, M2a, M2b, M2c Semiconductor switching element
R1 to R18 Resistor
Rshunt Current measuring resistor
S1a, S1b, S1c, S2a, S2b, S2c Changeover element
U1, U2 Operational amplifier
U3, U4 Optocoupler
Z1, Z2 Controllable zener diode
Prim-Control Control signal
Prim-DC Input voltage
DC-out1, DC-out2 Output voltage
I Output current
I_limit Limit value
P1, P2 Control signal
x, y Switch position

DETAILED DESCRIPTION

We provide a generic power supply unit arrangement comprising a first switching converter and a second switching converter. In the power supply unit arrangement, an open-loop control circuit connected to the first control loop and the second control loop is provided, wherein the open-loop control circuit is designed, upon a changeover of the current supply from the first switching converter to the second switching converter, to set a predetermined control state of the first control loop, deactivate the first switching converter and, upon a changeover of the current supply from the second switching converter to the first switching converter, and reactivate the first switching converter using the predetermined control state.

A power supply unit arrangement of this type allows the direct parallel connection of two switching converters without interposition of further components such as a coupling-in diode, for instance. As a result of the deactivation of the first switching converter, a disturbance of the second switching converter can be avoided. At the same time, as a result of the setting of a predetermined control state immediately before deactivation of a switching converter and subsequent reactivation using the predetermined control state of the same switching converter, a changeover process between the first and second switching converters can be carried out particularly rapidly. The rapid changeover avoids an overloading of the second power supply unit. Consequently, the power supply unit arrangement can be operated in each case with the best suited switching converter, which can be utilized, for example, to improve its energy efficiency.

The open-loop control circuit may be designed, upon a changeover of the current supply from the second switching converter to the first switching converter, to set a predetermined control state of the second control loop, subsequently deactivate the second switching converter and, upon a changeover of the current supply from the first switching converter to the second switching converter, reactivate the second switching converter using the predetermined control state. In that configuration, a substantially symmetrical arrangement of two switching converters is used, the switching converters being used alternately to supply a node with a controlled output voltage. A control state of the switching converter not currently being used is respectively predefined in this case such that a particularly rapid changeover is possible upon a load change from the first switching converter to the second switching converter.

The open-loop control circuit may comprise a current measuring circuit that compares an output current at an output of the power supply unit arrangement that provides the controlled output voltage with at least one predetermined limit value. In this case, a first rated output power of the first switching converter is greater than a second rated output power of the second switching converter and the open-loop control circuit is designed, after the output current falls below the predetermined limit value, to change over the current supply from the first switching converter to the second switching converter and, directly after the output current exceeds the predetermined limit value, change over the current supply from the second switching converter to the first switching converter. As a result of the measurement and the comparison of an output current with a predetermined limit value, depending on an output power taken up by the device, it is possible to use either the first switching converter having a greater rated output power or the second switching converter having a lower rated output power to provide the supply voltage. This takes into account, in particular, the insight that switching converters having different rated powers have their efficiency maximum typically at different output powers. The open-loop control circuit has the effect that a respective switching converter is operated in an expedient range of its rated output power such that the energy efficiency of the power supply unit arrangement overall is ensured over a wide supply power range.

The changeover from the first switching converter to the second switching converter may be carried out either immediately after identification of a predetermined limit value having been undershot or after a predetermined time period after identification of undershooting. In accordance with a first alternative, a temporary open circuit of the first switching converter is largely avoided. In accordance with a second alternative, it is possible to reduce the number of changeover processes between the first and second switching converters in the event of momentary load dips.

The first control loop and/or the second control loop may comprise(s) a closed-loop control element having a feedback path comprising at least one time-determining element. In this case, the open-loop control circuit is designed, in the held state, to hold an electrical controlled variable, in particular a charge of a capacitor used as time-determining element. The abovementioned features enable control loops known per se such as, in particular, control amplifiers with a capacitive element to be held in a predetermined state in a simple manner. If, by way of example, the charge of a capacitor used as time-determining element is held at a predetermined voltage level, the control state of the control loop overall can be maintained with a very low current consumption.

For this purpose the open-loop control circuit may comprise at least one first changeover element, wherein the at least one first changeover element optionally connects the time-determining element to at least one terminal of the closed-loop control element or a predetermined reference voltage. Provision of one or a plurality of changeover elements enables the time-determining element to be connected either to the normal control loop or to a predetermined reference voltage.

The open-loop control circuit may comprise at least one second changeover element, wherein the second changeover element optionally connects a control input of the first switching converter and/or of the second switching converter to an output of the closed-loop control element or a predetermined voltage potential to deactivate the first switching converter and/or the second switching converter. Provision of a second changeover element makes it possible in particular to pull the control input of a switching converter to a predetermined voltage potential such as ground, in particular, to deactivate the associated switching converter as fully as possible in times of inactivity.

In different configurations, the closed-loop control element is, for example, a negative feedback operational amplifier or a negative feedback, controllable zener diode.

The power supply unit arrangement may furthermore comprise at least one stabilization element connected to the node, in particular a storage capacitor, that stabilizes the voltage at the node in the case of output-side load changes.

Further advantages are disclosed in the appended claims and the detailed description of examples. Our power supply unit arrangements are described in detail below on the basis of different examples with reference to the appended figures, in which elements of identical type are provided with identical reference signs to afford a better understanding.

Figure 3:
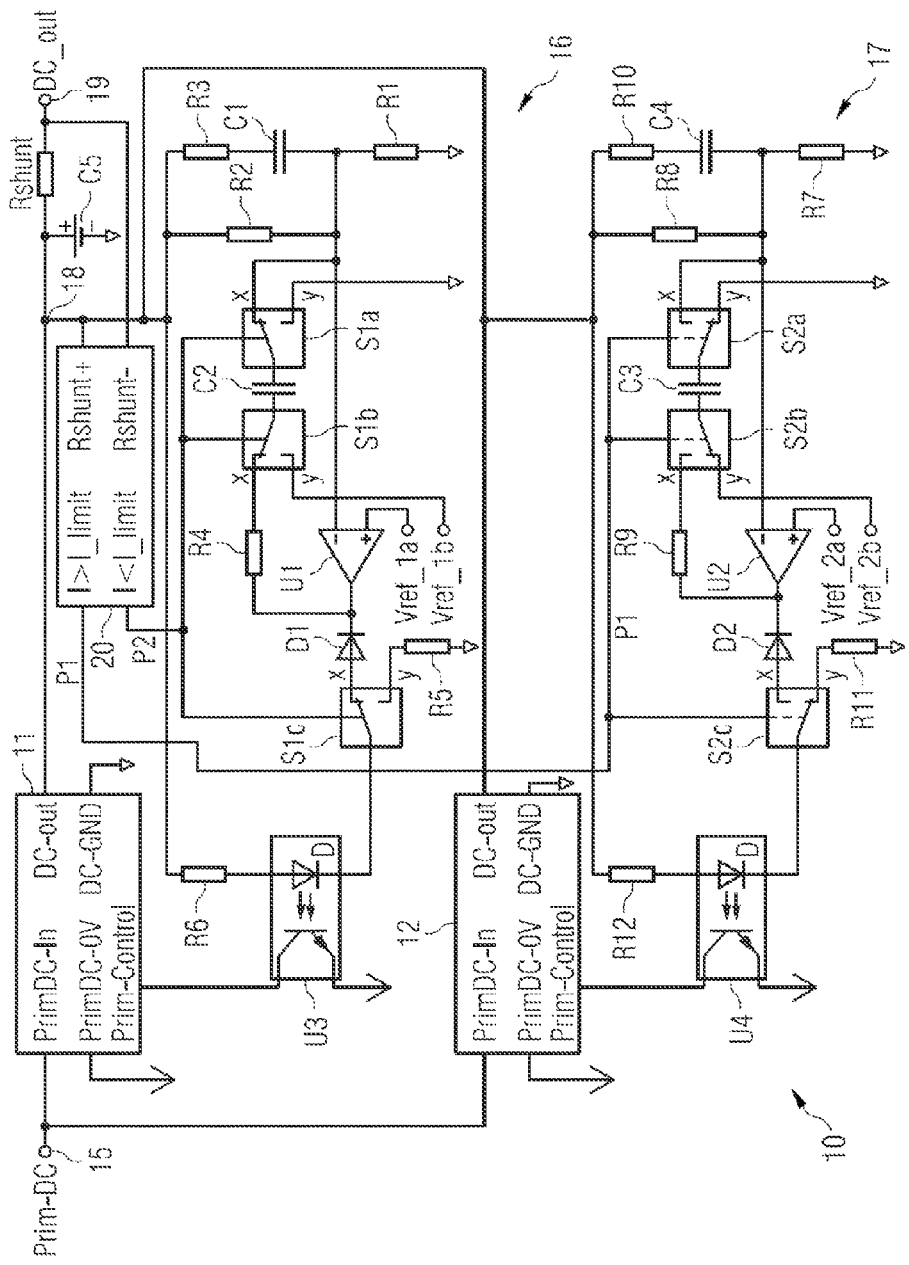
FIG. 3 shows a power supply unit arrangement in accordance with a first example.

FIG. 3 shows a power supply unit arrangement 10 in accordance with a first configuration. The power supply unit arrangement 10 comprises a first switching converter 11, in particular a main converter having an output power of 300 W, for example, and a first control loop 16 for the first switching converter 11. The power supply unit arrangement 10 furthermore comprises a second switching converter 12, in particular an auxiliary converter having a significantly lower output power of 20 W, for example, and a second control loop 17 for the second switching converter 12. To obtain the best possible efficiency in each case and avoid a mutual disturbance of the control loops 16 and 17, only one of the switching converters 11 and 12 is in operation at any point in time. In contrast, the respective other switching converter 12 or 11 is held in a state with the lowest possible energy consumption.

In the example, the first switching converter 11 and the second switching converter 12 are supplied by an input 15 with a common supply voltage Prim-DC. This involves a rectified intermediate voltage. The intermediate voltage Prim-DC can be generated from a power supply system AC voltage, for example, by an upstream rectifier circuit (not illustrated in FIG. 3). The output DC-out of the first switching converter 11 and the output DC-out of the second switching converter 12 are directly coupled to one another at a common node 18. In particular, no coupling-in diodes or other components leading to a significant reduction of the efficiency of the power supply unit arrangement 10 are provided between the switching converters 11 and 12 and a common output 19. The magnitude of the voltage at the node 18 is stabilized by a stabilization element in the form of a storage capacitor C5. In FIG. 1, the capacitor C5 is illustrated as a separate component. Alternatively, a stabilization element integrated into the first switching converter 11 and/or the second switching converter 12 can also be involved. The controlled voltage provided at the node 18 either by the first switching converter 11 or by the second switching converter 12 is output via the common output 19 of the power supply unit arrangement 10 to an electronic device (not illustrated in FIG. 3). In particular, the illustrated power supply unit arrangement 10 is suitable for use in a power supply unit for a computer.

A measuring resistor Rshunt connects between the node 18 and the common output 19. The resistor Rshunt connects to a current comparator 20, which can ascertain whether the current I output via the common output 19 is above or below a predetermined limit value I_limit, for example, a maximum output current of the second switching converter 12. If the instantaneous current I is above the limit value I_limit, a first control signal P1 is transmitted to three changeover switches S2a, S2b and S2c by the current comparator 20. In contrast, if the instantaneously output current I is below the limit value I_limit, a second control signal P2 is output to three changeover elements S1a, S1b and S1c. The outputs of the current comparator 20 switch synchronously in an inverted manner. Alternatively, a small time offset is also possible which brings about very brief parallel operation of the two control loops 16 and 17. The small time offset should be significantly less than the readjustment time of the switching converters 11 and 12, and is 10 ms, for example. Such a current measuring and open-loop control circuit enables the rapid provision of the internal control signals P1 and P2 independently of the supplied device. Consequently, the circuit enables a rapid reaction to secondary-side load changes without a corresponding prior warning by the supplied device.

In the state illustrated in FIG. 3, the first control signal P1 is activated and the second control signal P2 is deactivated. That is to say that the changeover elements S1a, S1b and S1c are each in a switch position x and the changeover elements S2a, S2b and S2c are each in a switch position y. In this state, that is to say in a relatively high output power, the first control loop 16 is closed via the changeover elements S1a, S1b and S1c.

The first control loop is essentially a switching amplifier with feedback as already illustrated in FIG. 1. By a voltage divider comprising resistors R1, R2, R3 and C1 the output voltage present at the node 18 is compared to a predefined reference voltage Vref_1a by an operational amplifier U1. An output of the operational amplifier U1 is fed back to the negative input of the operational amplifier U1 via a further resistor R4 and a capacitor C2. The control voltage provided on the output side at the operational amplifier U1 is used via a protective diode D1, a transmission light-emitting diode of an optocoupler U3 and a series resistor R6 that drives a reception transistor of the optocoupler U3 to provide a desired control voltage Prim-Control at a corresponding control input of the first switching converter 11.

In the illustrated control loop 16, the resistors R1 and R2 in the case of a stable output voltage form a proportional voltage divider that monitors the output voltage at the node 18 (P portion of the closed-loop controller). By the capacitor C1 and the resistor R3, which connect in parallel to the resistor R2, a derivative component of the control loop 16 is implemented to enable leading closed-loop control (D portion of the closed-loop controller). By the resistor R4 and the capacitor C2 in the feedback element, a negative feedback and thus an integral portion of the control loop 16 is implemented (I portion of the closed-loop controller). In this case, the capacitor C2 serves in particular to predefine a temporal component for the integration. Taken together, therefore, the control loop 16 is a PID closed-loop controller.

During operation with a constant load current, C1 is charged to the voltage VC1=DC-out−Vref_1a. The capacitor C2 is charged to the difference between the closed-loop controller output and the closed-loop controller input voltage, that is to say VC2=VU1out−Vref_1a. The voltage then present at the cathode of the transmission light-emitting diode of the optocoupler U3 during operation is therefore VD=Vref_1a+VC2+VD1. To reestablish this control state abruptly from the open circuit of the first switching converter 11, C2 has to be precharged and then connected into the control loop 16 in the charged state. In contrast, all other voltages are constant. This precharge takes place in the switched-off state by the second switching converter 12 (not illustrated).

If the first switching converter 11 is then intended to be switched off, the changeover elements S1a, S1b and S1c are brought from switch position x to switch position y. S1c brings about an increase in the optocoupler current to a value which immediately restricts the output current of the first switching converter 11 to zero. The capacitor C2 is disconnected from the control loop 16 with the aid of the changeover elements S1a and S1b and charged between a preset reference voltage Vref_1b and ground. Since the first switching converter 11 is only switched off if the current comparator 20 detects a low output current I, the switch-off takes place, e.g., at I_limit. As long as the current I remains below I_limit, the capacitor C2 remains connected to the reference voltage Vref_1b. No time sequence control is necessary for this purpose. If the current I rises slowly or rapidly again above the limit value I_limit, C2 is abruptly connected to the voltage at the central node of the voltage divider of the control loop 16. The correct control voltage is thus established abruptly at the optocoupler of the first control loop 16.

As can be discerned in FIG. 3, the control loop 17 of the second switching converter 12 is constructed substantially in accordance with the control loop 16 of the first switching converter 11. Therefore, a renewed description of the functionality thereof will largely be omitted at this juncture.

Unlike the control loop 16, the second control loop 17 in the illustrated state is interrupted by the switching elements S2a, S2b and S2c. In this case, as described above with regard to the first control loop 16, by the two changeover elements S2a and S2b, a capacitor C3 constituting the time-determining constant of the integral closed-loop control element of the second control loop 17, fixedly connects between a reference voltage Vref_2b and a ground potential of the power supply unit arrangement 10. The reference voltage Vref_2b is provided by the respectively active switching converter, that is to say by the first switching converter 11 in the illustrated state. It can be tapped off at the node 18, for example, such that no further switching element is required for its changeover (not illustrated).

The changeover to the reference voltage Vref_2b prevents the capacitor C3 from being discharged. At the same time, a transmission light-emitting diode of an optocoupler U4 of the second control loop 17 fixedly connects to a ground potential via a resistor R11. In this way, by a reception transistor of the optocoupler U4, a predetermined control signal Prim-Control is generated at a control input of the second switching converter 12, the control signal leading to deactivation of the second switching converter 12.

The changeover of the control loops 16 and 17, in each case in opposite directions, into the switch position x or the switch position y ensures that in each case only one of the two switching converters 11 or 12 is active to provide an operating voltage at the node 18. By contrast, the control loop 17 or 16 of the respective other switching converter 12 or 11 is held in a state which allows a rapid restart of the switching converter 12 or 11. In particular, the time otherwise required to run up a duty ratio of the switching converter 12 or 11 or adapt an operating frequency by readjusting the control loop 17 or 16 is avoided or at least greatly shortened.

In the example, the changeover between the two switching converters 11 or 12 is carried out automatically by the current comparator 20 by measurement of the current between the node 18 and the common output 19 via the measuring resistor Rshunt. The six changeover elements S1a, S1b, S1c, S2a, S2b and S2c are integrated into an integrated component, and can be driven in each case with a TTL level. The integrated component is designed to switch arbitrary voltages and in particular also the control voltages occurring in the control loops 16 and 17. The integrated component CD4053B from Texas Instruments is involved, for example.

Upon deactivation of the corresponding control loop 16 or 17 as a result of the changeover switches being switched into the switch position y, the voltage of the capacitors C1 and C4 respectively present in the control loop is maintained in each case. The voltage is predefined via the node 18. As described above, the charge of the capacitors C2 and C3 is predefined via the reference voltages Vref_1b and Vref_2b, respectively. The circuit described thus enables a rapid changeover between the control loops 16 and 17, without the capacitors C1 to C4 having to be subjected to charge reversal in a changeover phase, which would lead to a momentary dip in the voltage at the switching converter 11 or 12 respectively to be activated.

Figure 4:
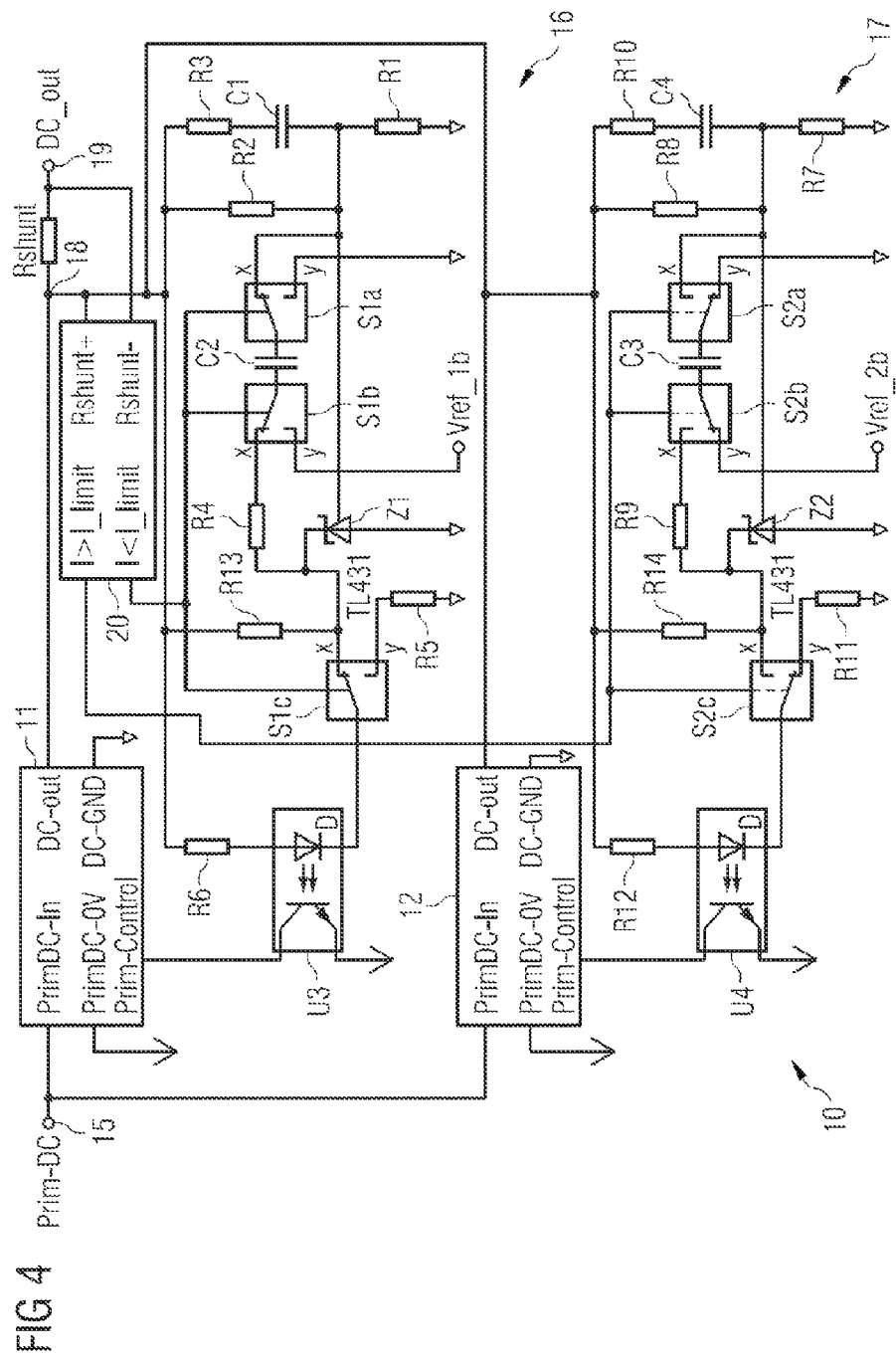
FIG. 4 shows a power supply unit arrangement in accordance with a second example.

FIG. 4 shows an alternative configuration. In this case, most of the circuit parts correspond to the circuit parts provided with the same reference signs in accordance with FIG. 3. Therefore, a renewed description of the circuit parts will be omitted.

In a departure therefrom, the configuration in accordance with FIG. 4 does not comprise a separate storage capacitor at the node 18. To stabilize the output voltage, use is made here of capacitors already provided in the first and/or second switching converter 11 and/or 12 (not illustrated).

Furthermore, the control loops 16 and 17 of the first switching converter 11 and second switching converter 12, respectively, in each case comprise a voltage-controlled, controllable zener diode Z1 and Z2, respectively, instead of the operational amplifiers U1 and U2, respectively. By way of example, the zener diodes Z1 and Z2 are diodes of the TL431 type. Use of the controllable zener diodes Z1 and Z2 makes it possible to dispense with providing the reference voltages Vref_1a and Vref_2a, respectively, in accordance with the configuration according to FIG. 3 because the reference voltages are already present internally in the TL431 reference diodes. Otherwise, the circuit in accordance with FIG. 4 has the same advantages as the circuit in accordance with FIG. 3.

Figure 5:
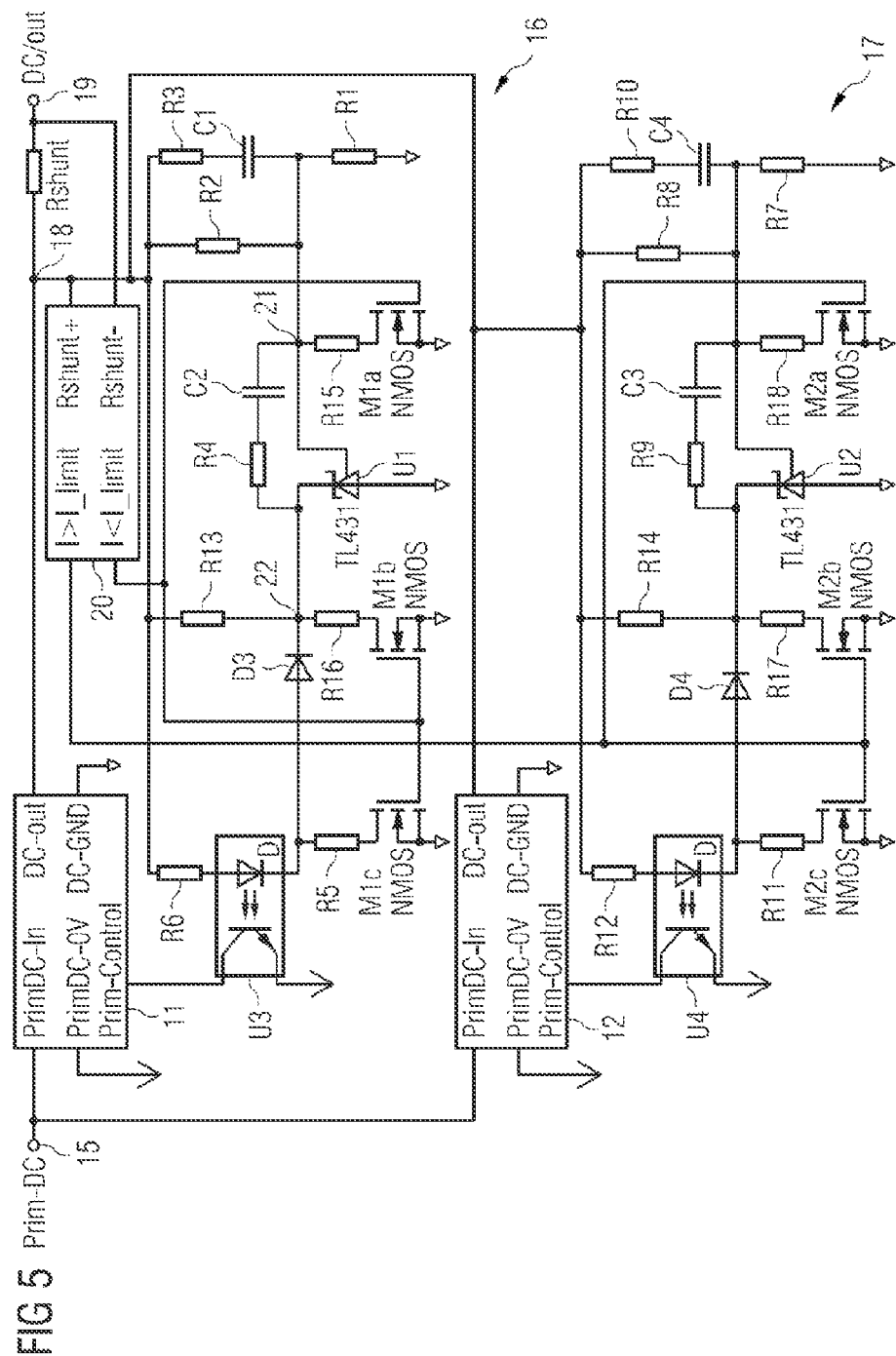
FIG. 5 shows a power supply unit arrangement in accordance with a third example.

FIG. 5 shows a further alternative configuration. In this case, most of the circuit parts correspond to the circuit parts provided with the same reference signs in accordance with FIG. 4 and, respectively, 3. Therefore, a renewed description of the circuit parts will be omitted.

Compared to the circuit in accordance with FIG. 4, the electronic changeover switches S1a to S2c have been replaced by semiconductor switching elements M1a to M2c. In the example, the semiconductor switching elements M1a to M2c are, in particular, NMOS small-signal transistors. If the first switching converter 11 is then intended to be switched off, the semiconductor switching elements M1a, M1b and M1c are switched on by the first control signal P1 being applied. The semiconductor switching element M1c brings about an increase in the current at the optocoupler U3 to a value which immediately restricts the output current of the first switching converter 11 to zero. The semiconductor switching element M1a reduces the input voltage at a first internal node 21 at a center tap of the voltage divider—formed by the resistors R1 and R2—via the resistor R15 somewhat below the rated input voltage of the controllable zener diode Z1, that is to say, e.g., from 2.5 V to 2.3 V. This ensures that the cathode-anode path of the zener diode Z1 acquires high impedance. The voltage then established at a second internal node 22 of the first control loop 16 is then determined by the semiconductor switching element M1b in series with the resistor R16, which together with the resistor R13 form a further voltage divider for the controlled output voltage DC-out. In this case, the resistor R16 is set such that the correct voltage necessary during a renewed rapid start of the first switching converter 11 is established at the capacitor C2. In this case, the diode D3 serves to be able to set the control voltage at the second internal node 22 independently of the voltage at the optocoupler U3 that is set via the resistor R5. The second control loop 17 of the second switching converter 12 is constructed correspondingly.

As described above, in an alternative to the circuit in accordance with FIG. 5, the changeover switches S1a to S2c can be replaced by less expensive small-signal MOSFETs. Moreover, in the circuit disclosed, the reference voltages Vref_1b and Vref_2b are omitted, thus resulting in a simpler circuit construction overall.

In the configurations described, the predefined reference voltages Vref_1b and Vref_2b are set such that they correspond to the typical control voltages of the control loops 16 and 17, respectively, in the case of an output current I near the limit value I_limit to change over from the first switching converter 11 to the second switching converter 12. As an alternative to fixedly preset reference voltages Vref_1b and Vref_2b, the voltages present at the capacitors C2 and C3, respectively, at this point in time can also be held by a so-called "sample and hold" circuit to safeguard the charged state of the capacitors C2 and C3, respectively, in times of inactivity.

In a departure from the configurations in accordance with FIGS. 3 and 4, the current comparator 20 can be configured such that its switching behavior has a hysteresis effect. This means that the changeover instant can be different for a falling and rising output current I. By way of example, the control signal P1 can immediately be activated if an instantaneous output current I rises above a predefined limit value I_limit, as described with reference to FIG. 3. Conversely, when the output power falls, the control signal P2 can be changed over only when the output current I falls below a limit value I_limit-I_hysteresis.

Instead of different limit values for a rising and falling output current I, the current comparator 20 can also output the corresponding control signals P1 or P2 only after a predetermined delay time has elapsed after the undershooting of an individual predetermined limit value I_limit. In this way, in particular, a frequent changeover between the first switching converter 11 and the second switching converter 12 is avoided if the output power output via the common output 19 falls only momentarily. It is only if the energy consumption of the supplied device remains below the threshold value I_limit for a long period, for example, because the device has adopted an energy saving state, that a load change from the first switching converter 11 to the second switching converter 12 takes place. A delay after the predetermined limit value I_limit has been exceeded is generally not expedient since otherwise there is the risk of the lower-power switching converter 12 switching off owing to overload.

In a further configuration (not illustrated), a power supply unit arrangement comprises more than two switching converters. By way of example, a power supply unit arrangement can comprise a first switching converter for a standby state, a second switching converter for an open-circuit state and a third switching converter for a full-load state to operate a computer system. In this case, the current comparator compares a present output current I with a plurality of different limit values for changeover between the first and second or second and third switching converters. Even further switching converters can also be provided to ensure the operation of the respectively active switching converter in the range of its optimum energy efficiency.

The invention claimed is:

1. A power supply unit arrangement for an electronic device comprising:
   a first switching converter with a first control loop that provides a controlled output voltage (DC-out) at a node;
   a second switching converter with a second control loop that alternatively provides the controlled output voltage (DC-out) at the node, at least the first control loop comprising a proportional-integral-derivative (PID) closed-loop controller with a closed-loop control element having a feedback path comprising at least one time-determining element; and
   an open-loop control circuit connected to the first control loop and the second control loop, wherein the open-loop control circuit, upon a changeover of the current supply from the first switching converter to the second switching converter, sets a predetermined control state of the first control loop, wherein setting the predetermined control state of the first control loop comprises holding a charge of a capacitor used as a time-determining element for integration by the PID controller of the first control loop, and deactivates the first switching converter and, upon a changeover of the current supply from the second switching converter to the first switching converter, reactivates the first switching converter using the predetermined control state of the first control loop to facilitate a changeover of the current supply from the second switching converter to the first switching converter.

2. The power supply unit arrangement according to claim 1, wherein the second control loop comprises a proportional-integral-derivative (PID) closed-loop controller with a closed-loop control element having a feedback path comprising at least one time-determining element and the open-loop control circuit furthermore, upon a changeover of the current supply from the second switching converter to the first switching converter, sets a predetermined control state of the second control loop, and wherein setting the predetermined control state of the second control loop comprises holding a charge of a capacitor used as a time-determining element for integration by the PID controller of the second control loop, and subsequently deactivates the second switching converter and, upon a changeover of the current supply from the first switching converter to the second switching converter, reactivates the second switching converter using the predetermined control state of the sound control loop to facilitate a changeover of the current supply from the first switching converter to the second switching converter.

3. The power supply unit arrangement according to claim 1, wherein the open-loop control circuit comprises a current measuring circuit that compares an output current (I) at an output of the power supply unit arrangement to provide the controlled output voltage (DC-out) with at least one predetermined limit value (I_limit), a first rated output power of the first switching converter is greater than a second rated output power of the second switching converter and the open-loop control circuit, after the output current (I) falls below the predetermined limit value (I_limit), changes over the current supply from the first switching converter to the second switching converter and, directly after the output current (I) exceeds the predetermined limit value (I_limit), changes over the current supply from the second switching converter to the first switching converter.

4. The power supply unit arrangement according to claim 3, wherein the open-loop control circuit changes over the current supply from the first switching converter to the second switching converter immediately after identification of the predetermined limit value (I_limit) having been undershot.

5. The power supply unit arrangement according to claim 3, wherein the open-loop control circuit changes over the current supply from the first switching converter to the second switching converter after a predetermined time period after identification of the predetermined limit value (I_limit) having been undershot or after a second predetermined limit value has been undershot, which is less than the first predetermined limit value (I_limit).

6. The power supply unit arrangement according to claim 1, wherein the open-loop control circuit comprises at least one first changeover element (S1a, S1b, S2a, S2b), and the at least one first changeover element (S1a, S1b, S2a, S2b) optionally connects the time-determining element (C2, C3) to at least one terminal of the closed-loop control element or a predetermined reference voltage (Vref_1b, Vref_2b).

7. The power supply unit arrangement according to claim 1, wherein the open-loop control circuit comprises at least one second changeover element (S1c, S2c), and the second changeover element (S1c, S2c) optionally connects a control input of the first switching converter and/or of the second switching converter to an output of the closed-loop control element or a predetermined voltage potential to deactivate the first switching converter and/or the second switching converter.

8. The power supply unit arrangement according to claim 7, wherein the control input of the first switching converter and/or of the second switching converter connects to the output of the closed-loop control element via an optocoupler (U3, U4).

9. The power supply unit arrangement according to claim 1, wherein the open-loop control circuit comprises at least one first semiconductor switching element (M1a, M2a), and the at least one first semiconductor switching element (M1a, M2a) reduces a control voltage at a first internal node of the first control loop and/or of the second control loop.

10. The power supply unit arrangement according to claim 9, wherein the first, second and/or third semiconductor switching element are/is configured as small-signal transistor or small-signal MOSFET.

11. The power supply unit arrangement according to claim 1, wherein the open-loop control circuit comprises at least one second semiconductor switching element (M1b, M2b), and the at least one second semiconductor switching element (M1b, M2b) sets a control voltage at a second internal node of the first control loop and/or of the second control loop.

12. The power supply unit arrangement according to claim 1, wherein the open-loop control circuit comprises at least one third semiconductor switching element (M1c, M2c), and the at least one third semiconductor switching element (M1c, M2c) optionally connects a control input of the first switching converter and/or of the second switching converter to a predetermined voltage potential to deactivate the first switching converter and/or the second switching converter.

13. The power supply unit arrangement according to claim 12, wherein the control input of the first switching converter and/or of the second switching converter connects to the output of the closed-loop control element via an optocoupler (U3, U4).

14. The power supply unit arrangement according to claim 1, wherein the closed-loop control element comprises at least one negative feedback operational amplifier (U1, U2) or at least one negative feedback, controllable Zener diode (Z1, Z2).

15. The power supply unit arrangement according to claim 1, further comprising at least one stabilization element connected to the node or a storage capacitor (C5), to stabilize the voltage at the node in output-side load changes.

16. A power supply for an electronic device having at least a high-load state and a low-load-state, comprising:
   a main switching converter with a first control loop that provides a controlled output voltage (DC-out) at a node for the electronic device in the high-load state;
   an auxiliary switching converter with a second control loop that alternatively provides the controlled output voltage (DC-out) at the node for the electronic device in the low-load state, at least the first control loop comprising a proportional-integral-derivative (PID) closed-loop controller with a closed-loop control element having a feedback path comprising at least one time-determining element and the controlled output voltage (DC-out) at the node being either provided by the main switching converter or the auxiliary switching converter; and
   a control circuit connected to the first control loop and the second control loop, wherein the control circuit, upon a changeover of the current supply from the main switching converter to the auxiliary switching converter, sets a predetermined control state of the first control loop, wherein setting the predetermined control state of the first control loop comprises holding a charge of a capacitor used as a time-determining element for integration by the PID controller of the first control loop, and deactivates the main switching converter and, upon a changeover of the current supply from the auxiliary switching converter to the main switching converter, reactivates the main switching converter using the predetermined control state of the first control loop to facilitate a changeover of the current supply from the auxiliary switching converter to the main switching converter.

17. A computer system having a normal operating state and at least one energy saving state, the computer system comprising a power supply unit, wherein the power supply unit comprises:
   a main switching converter with a first control loop that provides a controlled output voltage (DC-out) at a node for the computer system in the normal operating state;
   an auxiliary switching converter with a second control loop that alternatively provides the controlled output voltage (DC-out) at the node for the computer system in the at least one energy saving state, at least the first control loop comprising a proportional-integral-derivative (PID) closed-loop controller with a closed loop control element having a feedback path comprising at least one time-determining element and the controlled output voltage (DC-out) at the node being either provided by the main switching converter or the auxiliary switching converter; and
   a control circuit connected to the first control loop and the second control loop, wherein the control circuit, upon detection of a change of an operating state of the computer system from the normal operating state to the at least one energy saving state, changes the current supply from the main switching converter to the auxiliary switching converter, sets a predetermined control state of the first control loop, wherein setting the predetermined control state of the first control loop comprises holding a charge of a capacitor used as a time-determining element for integration by the PID controller of the first control loop, and deactivates the main switching converter and, upon detection of a change of the operating state of the computer system from the at least one energy-saving state to the normal operating state, changes the current supply from the auxiliary switching converter to the main switching converter and reactivates the main switching converter using the predetermined control state of the first control loop to facilitate a changeover of the current supply from the auxiliary switching converter to the main switching converter.

* * * * *